Patented Dec. 25, 1928.

1,696,471

UNITED STATES PATENT OFFICE.

NIELS C. CHRISTENSEN, OF SALT LAKE CITY, UTAH.

PROCESS OF TREATING ORES WITH CHLORIDE SOLUTIONS.

No Drawing.    Application filed May 25, 1926. Serial No. 111,664.

This invention relates to improvements in processes of treating ores with acid chloride solutions such as the processes of treating sulphide ores of lead and silver, etc., with chloride brines described in U. S. Patents Nos. 1,539,711, 1,539,712 and 1,539,713, and processes of treating oxidized ores and products with acid brines for the recovery of lead and silver therefrom or for the leaching of oxidized ores of zinc with HCl solutions. It relates particularly to processes for the regeneration of the acid consumed in lixiviating the ores and to the purification of the solutions used in the lixiviation process. It particularly relates to processes in which sodium chloride brines are used, and relates particularly to the cleaning of such solutions and the regeneration of the acid used in the processes, but is also applicable to the treatment of ores with water solutions of HCl.

As noted in U. S. Patent No. 1,539,711 an acid sodium chloride brine may be used for the recovery of lead and silver from sulphide ores. As also noted either sulphuric acid or hydrochloric acid may be used. An acid sodium chloride brine may also be used for the recovery of lead and silver from oxidized ores, and in this case also either sulphuric or hydrochloric acid may be used. If sulphuric acid is used with a sodium chloride brine for the treatment of such ores, the brine rapidly becomes contaminated with $Na_2SO_4$ to such a point that the solution loses its power to dissolve $PbCl_2$ and the $PbCl_2$ precipitated by cooling or dilution of the solution is contaminated with $PbSO_4$. As noted in U. S. Patent No. 1,539,711, if the $PbCl_2$, produced by cooling (or diluting and cooling) the pregnant brine, is smelted with finely divided lime or calcium carbonate, the calcium chloride formed in the smelting operation may be used to remove the sulphates from solution and prevent excessive fouling of the solution and of the $PbCl_2$ produced. The reactions which take place are indicated in the following:—the $H_2SO_4$ reacts with the salt in solution to form some HCl and $Na_2SO_4$ as indicated and the HCl thus formed acts on the PbS or $PbCO_3$ to form $PbCl_2$ which is dissolved in the brine.

$$2NaCl + H_2SO_4 = Na_2SO_4 + 2HCl$$
$$NaCl + H_2SO_4 = NaHSO_4 + HCl$$

or

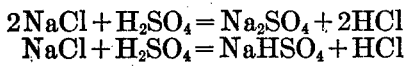

The $PbCl_2$ when smelted with a reducing agent and a suitable lime compound gives lead and calcium chloride and the calcium chloride when added to the solution precipitates out the sulphate as $CaSO_4$ and forms HCl in solution as indicated in the following chemical equations:

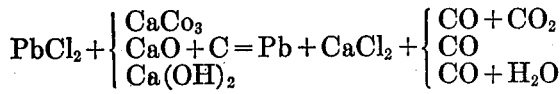

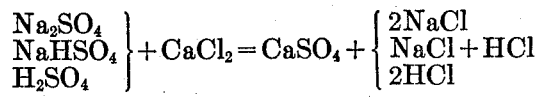

In this way the solution may be kept free from sulphates if only lead is dissolved out of the ore. In the treatment of practically all ores, however, minerals other than the lead minerals are dissolved, so that the solution becomes fouled with chlorides (or sulphates) of iron manganese and zinc, which when present in any but small amount reduce the solubility of $PbCl_2$ in the brine and tend to contaminate the $PbCl_2$ produced. The iron, manganese and zinc salts, etc. (and other salts such as $AlCl_3$, etc.) must, therefore, be removed from the solution at intervals depending on the amount of impurities dissolved (which will vary with different ores).

As sulphuric acid is considerably cheaper than hydrochloric acid, it would be advantageous if $H_2SO_4$ could be used in the process instead of HCl. It is the object of my process to combine the removal of the impurities from solution with the direct use of $H_2SO_4$ in such a manner as to avoid contamination of the solution with sulphates and secure a clean lead chloride precipitate and at the same time if desired remove the impurities from solution in products of sufficient purity to be of value.

The manner in which this is accomplished in my process consists in general of precipitating the impurities from solution by means of a suitable calcium compound so as to leave the chlorine combined therewith in solution as $CaCl_2$. To the brine containing this calcium chloride $H_2SO_4$ is added precipitating $CaSO_4$ and forming HCl as indicated in the following:

$$CaCl_2 + H_2SO_4 = CaSO_4 + 2HCl$$

and the HCl acid brine thus formed is used in the leaching or lixiviation of the ore. If the $PbCl_2$ produced in the process is smelted with a lime compound as noted above the $CaCl_2$ formed in this operation is also added to the solution and in this way only HCl acid is used in the direct treatment of the ore and $H_2SO_4$ is used only indirectly thus reducing the cost of acid and avoiding contamination of the solutions. If the $PbCl_2$ is not smelted so as to secure $CaCl_2$, sufficient HCl must be used, instead of $H_2SO_4$, to form $PbCl_2$ with the lead in the ore.

The method and materials used in precipitating the impurities from solution will vary with the nature of the impurities and the products desired, the only essential feature being that the precipitation shall be carried out with a calcium compound so that the chlorine, combined with the metals to be removed from solution, shall be left in solution as $CaCl_2$. For example aluminum and ferric iron may be precipitated with finely divided calcium carbonate (limestone) as hydroxides as indicated in the following chemical equation:

$$\left.\begin{array}{l}2AlCl_3\\2FeCl_3\end{array}\right\} + 3CaCO_3 + 3H_2O = \left.\begin{array}{l}2Al(OH)_3\\2Fe(OH)_3\end{array}\right\} + 3CaCl_2 + 3CO_2$$

Ferrous iron may be precipitated as hydroxides by means of $CaCO_3$ or $Ca(OH)_2$ and through agitation with air to secure oxidation as indicated below:

$$2FeCl_2 + \left\{\begin{array}{l}2CaCO_3 + O + 3H_2O\\2Ca(OH)_2 + O + H_2O\end{array}\right. = 2Fe(OH)_3 + 2CaCl_2 + \left\{\begin{array}{l}2CO_2\\ -\end{array}\right.$$

Iron, zinc and manganese (not complete) may be precipitated as hydroxides by means of $Ca(OH)_2$ as indicated below:

$$\left.\begin{array}{l}FeCl_2\\ZnCl_2\\MnCl_2\end{array}\right\} + Ca(OH)_2 = CaCl_2 + \left\{\begin{array}{l}Fe(OH)_2\\Zn(OH)_2\\Mn(OH)_2\end{array}\right.$$

Iron, zinc, manganese and lead may be precipitated as sulphides by means of $Ca(SH)_2$ as described in U. S. Patents No. 1,549,062 and No. 1,572,268 and as indicated below:

$$\left.\begin{array}{l}FeCl_2\\ZnCl_2\\MnCl_2\end{array}\right\} + Ca(SH)_2 = CaCl_2 + H_2S + \left\{\begin{array}{l}FeS\\ZnS\\MnS\end{array}\right.$$

Zinc, iron and manganese may be precipitated as sulphides by means of $CaCO_3$ (or $Ca(OH)_2$) and $H_2S$ as described in my U. S. patent application No. 66,400 and as indicated in the following chemical equations:

$$\left.\begin{array}{l}ZnCl_2\\FeCl_2\\MnCl_2\end{array}\right\} + H_2S + CaCO_3 = CaCl_2 + CO_2 + H_2O + \left\{\begin{array}{l}ZnS\\FeS\\MnS\end{array}\right.$$

This last precipitation may be made selective as described in U. S. patent application Serial No. 66,400, the zinc being precipitated first as a pure white sulphide, followed by the iron as a pure black sulphide and finally the manganese as a clean flesh colored or orange colored sulphide.

As noted in all the foregoing methods of precipitation the chlorine combined with the impurities in solution (such as $AlCl_3$, $FeCl_3$, $FeCl_2$, $MnCl_2$ $ZnCl_2$) or with the residual lead in solution, remains in solution, after the precipitation, as $CaCl_2$. This $CaCl_2$ solution is then treated with $H_2SO_4$ at the correct or desired point in the cycle of operation and the calcium thus precipitated out as $CaSO_4$ leaving the chlorine in solution as HCl. This HCl acid brine is then used in the treatment of more ore.

The point in the cycle of operation at which the $H_2SO_4$ is added will depend upon the nature of the solution and the process and whether or not the $CaSO_4$ is to be recovered. If the $CaSO_4$ is to be recovered the $H_2SO_4$ is added to the solution before the solution is mixed with the ore which is to be leached. The precipitated $CaSO_4$ is then filtered out of the HCl acid solution and this solution is used for the treatment of the ore. In the leaching of oxidized zinc ores with HCl this procedure is preferably used, though it involves the filtering of the HCl solution to remove the $CaSO_4$. In the leaching of lead ores with acid sodium chloride brines the brine from the precipitation department must ordinarily be concentrated and heated before being reused and in this case the recovery of the $CaSO_4$ is more difficult as it involves either the filtration of the hot corrosive acid brine, or the heating of the corrosive acid brine after filtration. The hot acid brine holds considerably more $CaSO_4$ in solution than a neutral or slightly acid brine and some $CaSO_4$ is, therefore, precipitated in the pulp as the acid is neutralized during the treatment of the ore. If no attempt is to be made to recover the $CaSO_4$ the $H_2SO_4$ may be added to the mixture of ore and solution during the leaching operation (preferably carried out by agitating the mixture of ore and solution) thus generating the HCl and precipitating the $CaSO_4$ in the pulp (i. e. mixture of ore and solution), the $CaSO_4$ being left behind with the residual ore when the pregnant solution is filtered away. The precipitation of the $CaSO_4$ in the mixture of ore and solution, causes the formation of a thicker pulp which is ordinarily agitated, pumped and filtered with less difficulty than the original mixture. Also in the treatment of lead sulphide ores with acid brines this method of procedure greatly reduces the amount of frothing caused by the evolution of $H_2S$. If a large amount of $CaSO_4$ is precipitated in the pulp it may, however, become too thick to be handled and this limit should, therefore, not be too closely approached in the using process.

From the foregoing it will be apparent that any process of cleaning solutions and regenerating the HCl used in leaching ores or mineral products may be used to advantage in leaching operations using a water solution of HCl and is of special value in leaching operations using an acid sodium chloride brine such as the processes mentioned for the recovery of lead and silver (and zinc) from sulphide ores. It will also be apparent that although any suitable calcium compound may be used for precipitation that the differential precipitation of the metals as sulphides by means of $CaCO_3$ and $H_2S$ so as to secure clean separate marketable products is preferable where the $H_2S$ is available. This general method of precipitation is described in my U. S. patent application Serial No. 66,400 and the specific method and apparatus preferred for carrying out this precipitation is described in my U. S. patent application Serial No. 106,567. Any of the above mentioned methods of precipitation may be used, however, if as previously noted the chlorine is left in the solution as $CaCl_2$.

Having described my process what I claim and desire to patent is:

1. In the treatment of ores with acid chloride solutions, precipitating dissolved metal therefrom by means of a calcium compound so as to leave in said solutions as $CaCl_2$ the chlorine combined with said metals before precipitation and thereafter mixing said solution containing said $CaCl_2$ with comminuted ore and adding $H_2SO_4$ to said mixture to precipitate the calcium from said solution as $CaSO_4$ and to form HCl in said solution and thereby dissolving metals out of said ore in said solution.

2. In the treatment of ores with acid chloride brines, precipitating dissolved metals therefrom by means of a calcium compound so as to leave in said brine as $CaCl_2$ the chlorine combined with said metals before precipitation and thereafter mixing said solution containing said $CaCl_2$ with comminuted ore and adding $H_2SO_4$ to said mixture to precipitate $CaSO_4$ from said solution and to form HCl in said solution and thereby dissolving metals out of said ore and brine.

3. In the treatment of ores with acid sodium chloride brines the precipitation of dissolved metals from said solutions by means of a calcium compound so as to leave in said brine as $CaCl_2$ the chlorine combined with said metals before precipitation, and thereafter mixing said solution containing said $CaCl_2$ with comminuted ore and adding $H_2SO_4$ to said mixture to precipitate $CaSO_4$ from said solution and to form HCl in said solution and thereby dissolving metals out of said ore in said brine.

4. In the treatment of ores with acid chloride solutions, precipitating metals from said solutions as sulphides by means of $CaCO_3$ and $H_2S$ and thereafter adding $H_2SO_4$ to said precipitated solution to decompose the $CaCl_2$ formed in solution in said process of precipitation, and to precipitate $CaSO_4$ and form HCl in said solution and using said HCl solution thus prepared in the treatment of more ore.

5. In the treatment of ores with acid chloride brines, precipitating metals from said solutions as sulphides by means of $CaCO_3$ and $H_2S$ and thereafter adding $H_2SO_4$ to said precipitated solution to decompose the $CaCl_2$ formed in said process of precipitation and to precipitate $CaSO_4$ and form HCl in said solution and using said acid brine thus prepared in the treatment of more ore.

6. In the treatment of ores with acid sodium chloride brines, precipitating metals from said solutions as sulphides by means of $CaCO_3$ and $H_2S$ and thereafter adding $H_2SO_4$ to said precipitated solution to decompose the $CaCl_2$ formed in said process of precipitation and precipitate $CaSO_4$ and form HCl in said solution and using said acid brine thus prepared in the treatment of more ore.

7. In the treatment of ores with acid chloride solutions, precipitating metals therefrom as sulphides by means of $CaCO_3$ and $H_2S$ and thereafter mixing the resulting solution containing $CaCl_2$ with comminuted ore and adding $H_2SO_4$ to said mixture to precipitate $CaSO_4$ and form HCl in said solution and thereby dissolving metals out of said ore in said solution.

8. In the treatment of ores with acid chloride brines, precipitating metals therefrom as sulphides by means of $CaCO_3$ and $H_2S$, and thereafter mixing the resulting solution containing $CaCl_2$ with comminuted ore and adding $H_2SO_4$ to said mixture to precipitate $CaSO_4$ and form HCl in said solution and thereby dissolving metals out of said ore in said solution.

9. In the treatment of ores with sodium chloride brines, precipitating metals therefrom as sulphides by means of $CaCO_3$ and $H_2S$, and thereafter mixing the resulting brine containing $CaCl_2$ with comminuted ore and adding $H_2SO_4$ to said mixture to precipitate $CaSO_4$ and form HCl in said solution and thereby dissolving metals out of said ore in said solution.

In testimony whereof I have signed my name to this specification.

NIELS C. CHRISTENSEN.